United States Patent [19]
Epperson

[11] Patent Number: 5,803,384
[45] Date of Patent: Sep. 8, 1998

[54] CENTRIFUGAL CASTING CONTROL FOR FISHING REELS

[76] Inventor: Frank E. Epperson, 1235 S. Birch St., Apt. 505, Aurora, Colo. 80222

[21] Appl. No.: 629,341

[22] Filed: Apr. 8, 1996

[51] Int. Cl.⁶ .................................................. A01K 89/01
[52] U.S. Cl. ......................... 242/234; 242/236; 242/238; 43/19
[58] Field of Search ..................... 242/234, 236, 242/238, 239, 240; 43/19

[56] References Cited

U.S. PATENT DOCUMENTS

| | | | |
|---|---|---|---|
| 2,668,025 | 2/1954 | Hull | 242/238 |
| 3,400,480 | 9/1968 | Worsham | 43/19 |
| 3,419,992 | 1/1969 | Strahm | 242/236 |
| 4,725,013 | 2/1988 | Epperson | 242/84.21 A |
| 5,138,788 | 8/1992 | Buenzli et al. | 43/25 |
| 5,346,158 | 9/1994 | Epperson | 242/236 |
| 5,396,035 | 3/1995 | Studanski | 177/132 |

FOREIGN PATENT DOCUMENTS 739666  8/1966  Canada ........................................ 43/19

*Primary Examiner*—Donald P. Walsh
*Assistant Examiner*—Emmanuel M. Marcelo
*Attorney, Agent, or Firm*—John E. Reilly

[57] ABSTRACT

A casting control mechanism for fishing reels includes a weighted member slidably mounted within the handle portion of the fishing rod and which in response to forward casting of the rod and reel will advance into engagement with a trip arm extending from the rod into the reel to release one or more line pick-up members utilized to control the advancement of a fishing line from the reel; and the weighted member is adjustably positioned within the handle portion by the fisherman to control the point of release of the fishing line in response to casting of the line.

18 Claims, 2 Drawing Sheets

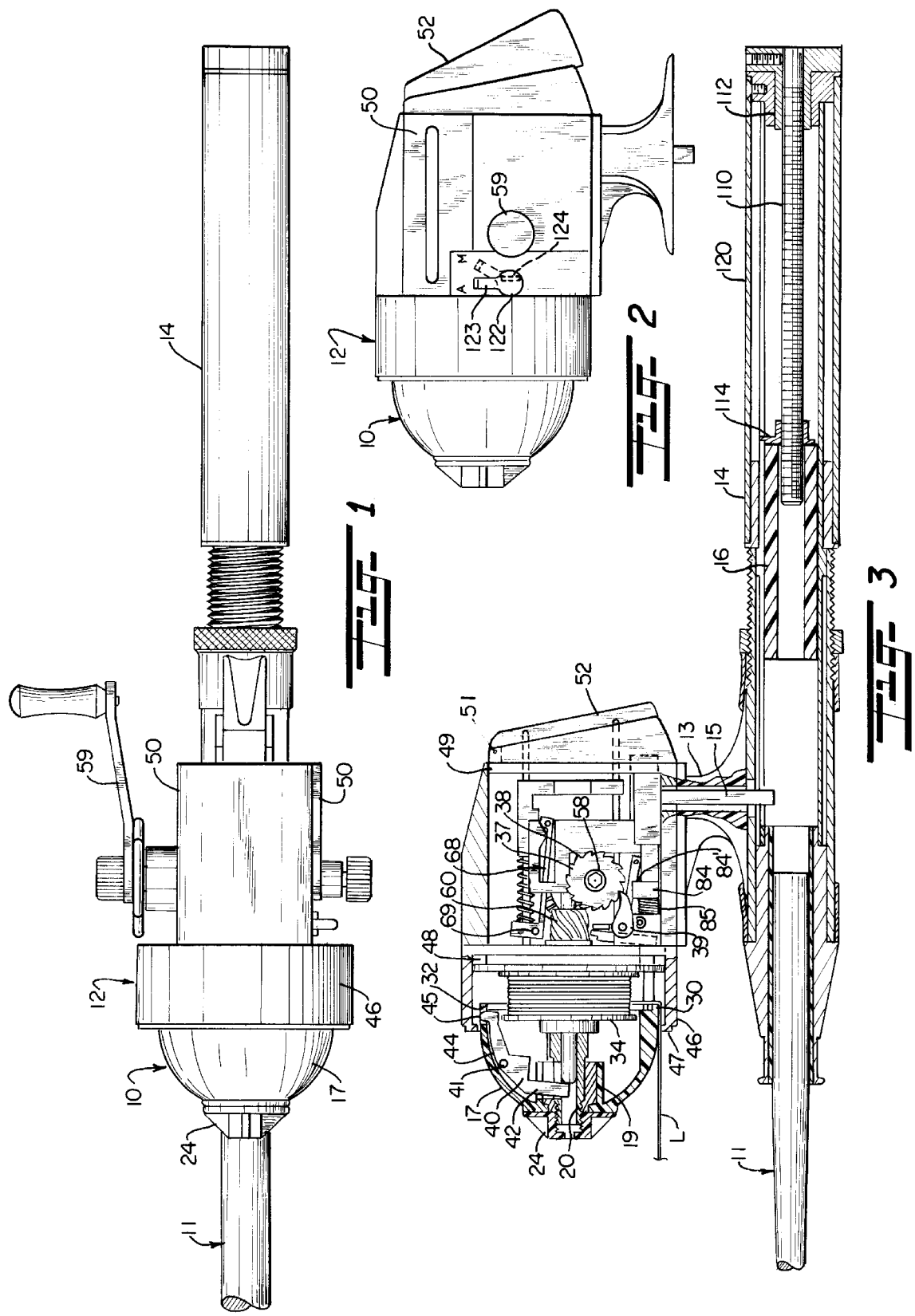

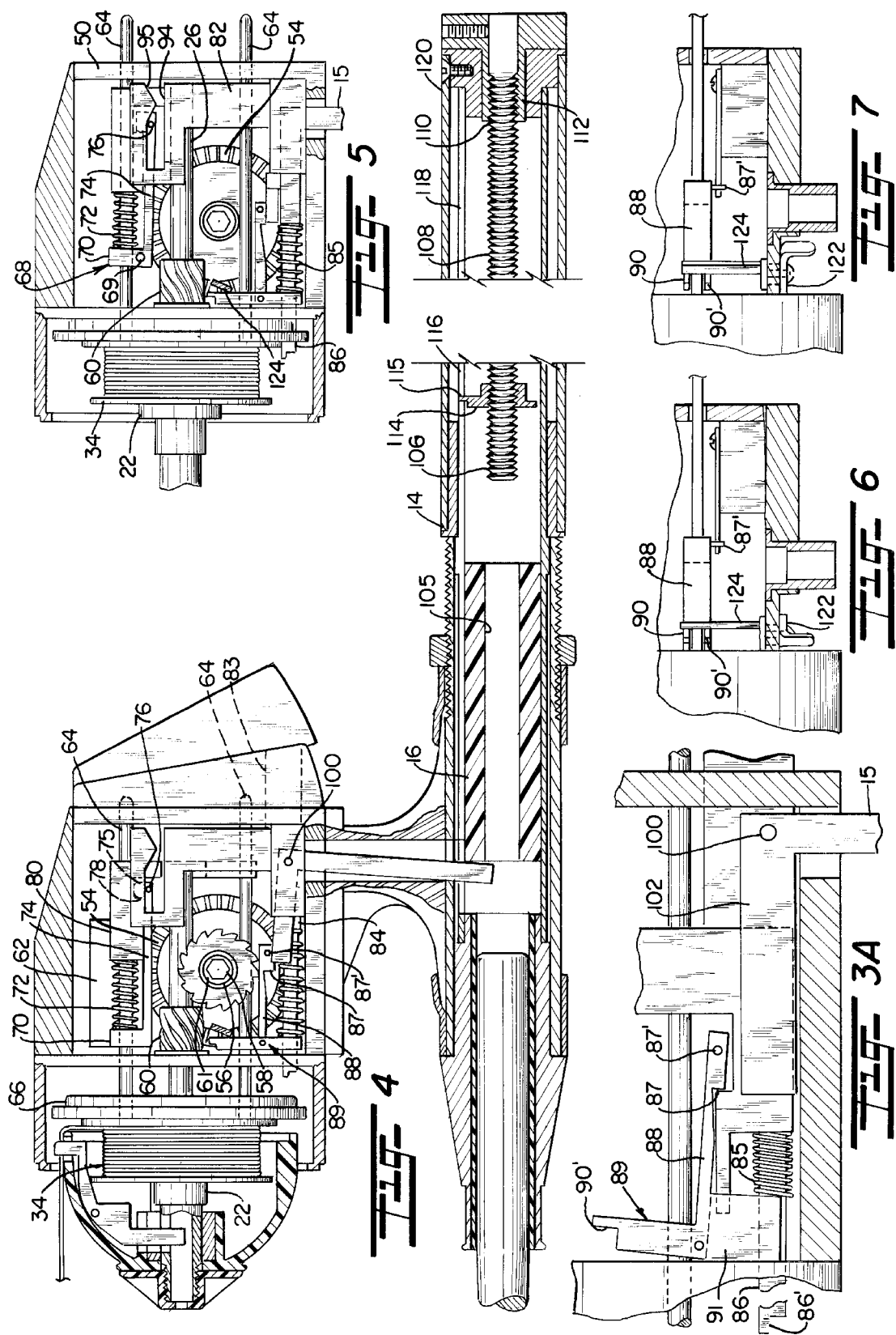

CENTRIFUGAL CASTING CONTROL FOR FISHING REELS

BACKGROUND AND FIELD OF INVENTION

This invention relates to a casting control mechanism for fishing reels, and more particularly relates to a novel and improved method and means for automatically controlling release of a fishing line off of a reel in response to the casting motion of the reel.

I have previously devised casting control mechanisms for fishing reels and reference is made in particular to U.S. Pat. No. 5,346,158 entitled CASTING REEL WITH AUTOMATIC DRAG AND CASTING MECHANISM wherein a weighted member is located in the fishing reel and, in response to the casting motion, will automatically retract a line pick-up member out of the path of advancement of the line so that it is free to unwind off of the spool. Among other problems in placing the weighted member in the reel itself is that it is difficult for the fisherman to control the point of release of the line in the limited space that the weight travels, and the weighted member cannot be adjusted or timed very easily without fairly sophisticated control mechanisms.

It is therefore proposed to mount the weighted member externally of the reel, such as, in the handle of the fishing rod and, through a lever arm and the like effect retraction of the line pickup member out of the path of advancement of the line. In this way, the weighted member can be easily adjusted or positioned according to the speed of cast of each individual and prevent premature line release. Furthermore, external placement of the weighted member greatly simplifies the line release mechanism and avoids extensive retrofitting of the reel itself and without substantially altering the existing manual control release mechanism. In this connection, the reel is readily convertible between manual and automatic control, for example, in situations where the fisherman prefers not to employ the automatic line release mechanism.

SUMMARY OF THE INVENTION

It is therefore an object of the present invention to provide for a novel and improved line release mechanism for a fishing reel which is highly reliable and efficient in operation.

It is another object of the present invention to provide for a novel and improved fishing line release mechanism which is easily and closely adjustable over a wide range to control the point of release of the fishing line during the casting motion and to do so automatically in response to the centrifugal force or momentum generated by the casting motion.

It is a further object of the present invention to provide for a novel and improved fishing line release mechanism for a fishing reel in which the release mechanism itself is mounted externally of the reel; and further wherein the line release mechanism includes a weighted member disposed in the handle of a fishing rod to which the reel is attached, the weighted member being readily adjustable to control its distance of travel to the point of release during the casting motion.

An additional object of the present invention is to provide for a novel and improved automatic casting mechanism which is of simplified construction and readily conformable for use in combination with conventional reels to control the point of release of the fishing line in casting and wherein the casting mechanism is interchangeable for use with conventional, manually controlled casting mechanisms.

In accordance with the present invention, a casting control mechanism has been devised for a fishing reel in which a fishing line is wound upon a spool at one end of a drive shaft and a line pick-up member is movable into the path of the fishing line away from the spool in response to rotation of the spool and characterized in particular by release means mounted in the reel for retracting the pick-up member out of the path of the fishing line including a trip arm and centrifugal force-responsive means the latter being mounted externally of the reel to engage the trip arm and activate the release means in response to a centrifugal force resulting from a forward casting motion of the reel. Preferably, the centrifugal force-responsive means takes the form of a weight or floating member which is slidably mounted in a rod to which the reel is attached, the weight being slidable in the direction of casting into engagement with the trip arm to activate the release means. An adjustment mechanism is provided within the handle portion of the rod to regulate the initial position of the weight and its travel into engagement with the trip arm in response to the casting motion so that the timing and point of release of the fishing line can be controlled by the fisherman.

It is further desirable to employ the centrifugal force-responsive means in association with a conventional manual casting control mechanism on the reel so that the fisherman either may select the centrifugal force-responsive means or the manual casting control mechanism to cast with the reel.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is a top plan view of a preferred form of fishing reel assembly in accordance with the present invention;

FIG. 2 is a side elevational view of the preferred form of fishing reel forming a part of the assembly of FIG. 1;

FIG. 3 is a longitudinal sectional view of the preferred form of assembly shown in FIG. 1 and illustrating the line release prior to casting;

FIG. 3a is an enlarged view partially in section of a portion of the automatic control mechanism locked out to permit manual control as in FIG. 3;

FIG. 4 is another sectional view enlarged of the preferred form of assembly shown in FIGS. 1 to 3 and illustrating the line release mechanism after casting and starting to reel in the line;

FIG. 5 is an enlarged side view partially in section of the spool drive and portion of the automatic control mechanism shown in the "automatic" position;

FIG. 6 is an enlarged view partially in section of the automatic/manual control for the release mechanism and shown in the "automatic" position; and FIG. 7 is another enlarged view of the automatic/manual control shown in the "manual" position.

DETAILED DESCRIPTION OF PREFERRED EMBODIMENT

Referring in more detail to the drawings, there is illustrated in FIGS. 1 through 7 a preferred form of casting reel assembly which is broadly comprised of a casting reel 10 and rod 11, the reel 10 including an outer casing or housing 12 and a lower tang or attachment 13 to secure the reel 10 to the fishing rod 11 in a well-known manner.

In accordance with the present invention, a fishing line release mechanism to be hereinafter described in detail controls movement of line pick-up members 45 and 86 into and out of the path of advancement of a fishing line L under the control of an activating mechanism which includes a trip arm 15 extending downwardly through the tang 13 into the hollow interior of a handle portion 14 of the rod 11 and centrifugal force-responsive means in the form of a weight member 16 in the rod 11. Briefly, the forward casting motion of the rod 11 and reel 10 by a fisherman will generate enough force to cause sliding motion of the weight member 16 through the hollow interior of the handle portion 14 against the trip arm 15 to activate the release mechanism so that the line L is free to unwind under the same casting motion.

As a setting for the present invention, the reel 10 includes a forward generally conical nose member 17 converging away from a forward, open end of the casing 12 and has a unitary central sleeve 19 disposed on a tubular shaft 20. The nose member 17 has a generally spherical or rounded end wall which diverges rearwardly and terminates in a generally cylindrical skirt 30. A generally rectangular slot or recess 32 is formed in the skirt, and a fishing line L extends from a spool 34 over the trailing edge of the skirt 30. An enlarged boss 22 is mounted on the shaft 20, and the shaft 20 has an externally threaded portion at its leading end which receives a nut 24 to securely mount the nose 17 on the shaft 20. The shaft 20 is journaled in an outer concentric release tube 26 which is supported at its rearward end in a slidable control plate 82.

A line pick-up member is defined by a lever arm 40 which is pivotally mounted as at 41 within the hollow interior of the nose 17 and includes a downwardly projecting leg 42 movable through an axially extending slot in the shaft 20. In turn, an upper leg 44 of the lever has a vertically upwardly extending, free pick-up end 45 which is movable through the slot 32 to engage the line L. When the lever 40 is advanced between the inwardly disposed release position shown in FIG. 3 to a radially outwardly disposed pick-up position, as shown in FIG. 4, it will move into the path of the line to prevent it from playing off the spool 34.

The casing 12 includes a forward cylindrical end 46 which houses the spool 34 and an radially inwardly directed rim 47 at its leading end. A rectangular support frame behind the cylindrical end 46 has spaced parallel end plates 48 and 49 interconnected by spaced parallel side walls 50. The end plate 49 is recessed for insertion of a conventional thumb control lever 52 which pivots about pin 51 to control the manual casting operation in a manner to be described.

Brief mention will be made of the crank and automatic drag mechanism which corresponds to that shown in my hereinabove referred to U.S. Pat. No. 5,346,158. A circular gear 54 includes a central hub 56 which receives a crankshaft 58 on crank handle 59. A drag mechanism including a sleeve 61 with an inner hexagonal bore receives the hexagonal end of the crankshaft 58 to impart controlled drag to the line L in a manner to be described in more detail in my U.S. Pat. No. 5,346,158. The rotation of the crankshaft 58 is imparted through friction washers, not shown, to the circular gear 54, and the gear 54 intermeshingly engages the worm gear 60 on the front end wall 48 and through shaft 20 and nut 24 for rotation of the nose portion 17 during the reeling operation. A shoulder on the drive gear 54 rides in a track, not shown, in a rectangular slide frame 62 to impart reciprocal motion to the frame 62. A pair of upper and lower, axially directed rods 64 are slidable through the end wall 48 and are connected to a support plate 66 on the back of the spool 34. The rods 64 follow the reciprocal movement of the slide frame 62 in order to reciprocate the support plate 66 and attached spool 34 for level-winding of the line L on the spool 34. A carrier 68 is pivotally attached as at 69 to the slide frame 62 including a bifurcated end 70 which extends upwardly to straddle the upper rod 64 and to serve as an end stop for the leading end of return spring 72 on the upper rod 64. A horizontal leg 74 of the carrier 68 extends rearwardly and terminates in an upwardly directed lip 75, and a transverse pin 76 extends laterally from the rearward end of the leg 74. During the reeling operation, the rearward travel of the carrier 68 with the frame 62 will cause the lip 75 to move into engagement with a notch 78 on the undersurface of a spacer block 80. The block 80 is affixed to the upper and lower rods 64 to impart the reciprocal motion of the frame 62 to the rods 64 when the carrier lip 75 is seated in the notch 78.

In the manual casting operation, the control plate 82 is mounted at the rearward end of the release tube 26 and includes a lower end having a rearward extension 83 in the path of travel of the lower end of the thumb button control member 52 and a forward extension 84 which abuts a rearward end of a return spring 85 on pick-up rod 86. A notch 84' in the upper surface of the forward extension is movable forwardly into engagement with a shoulder 87 on horizontally extending leg 88 of a pivot member 89. The pivot member 89 also includes a vertically extending leg 90 extending upwardly from the forward end of the leg 88 with a notched portion 90' at its upper terminal end and a lower bifurcated end 91 of the leg 90 straddles the pick-up rod 86. It is important to note that the return spring 85 on the pick-up rod 86 is advanced forwardly with forward extension 84 to yieldingly urge the bifurcated end 91 to pivot in a clockwise direction sufficient to cause the horizontally extending leg 88 and its shoulder 87 to swing downwardly into the notch 84'; however, in the "manual" mode, the pivot member 89 is fixed against any pivotal movement in a manner to be described so that the shoulder 87 is held in an upper position out of the path of the notch 84'.

When the control plate 82 is driven forwardly by the thumb control 52, as shown in FIGS. 3 and 3A, the release tube 26 is advanced forwardly into engagement with the lower end of the leg 42 of the line control lever 40 to cause downward pivotal movement of the line pick-up 45 out of the path of the line L, and the leading end 86' of the pick-up rod 86 is advanced into engagement with the skirt 30 across the path of travel of the line L to prevent the line L from unwinding off the spool 34 when the fisherman prepares to cast. As best seen from FIG. 5, the upper end of the control plate 82 has a rearwardly directed open slot 94 with a downwardly directed cam surface 95 toward its rearward end, the pin 76 on the carrier 68 riding within the upper portion of the slot 94 during the reeling operation as described. When the control plate 82 is advanced forwardly, the cam surface 95 will engage the pin 76 to drive the lip 75 downwardly out of the notch 78 in the spacer block thereby causing the rods 64 to be retracted along with the spool 34 preliminary to casting. In the "manual" mode of operation, the shoulder 87 on the horizontal leg of the pivot 89 is held upwardly in a manner to be described so as not to move into engagement with the forward extension 84 on the control plate 82. Thus, when the thumb control 52 is released the control plate 82 is urged rearwardly by the return spring 85 to retract the lower pick-up rod 86 out of the path of movement of the line L. At the same time, the pivot leg 74 on the carrier 68 is pivoted upwardly by the return spring 72 to cause the lip 75 to move into engagement with the notched portion 78 on the spacer block 80 during the reeling operation to impart the reciprocal motion of the frame 62 to the spool 34 for level-winding of the line L about the spool 34.

Now referring to the "automatic" mode of operation, the trip arm 15 extends downwardly through the hollow interior of the tang 13 from a pivot shaft 100 within the reel housing 12, and a horizontal arm 102 extends forwardly from the pivot shaft 100 for a distance such that the forward free end of the arm 102 is disposed beneath a release pin 87' on the horizontal leg 88. As a result, when the trip arm 15 is driven forwardly from the position shown in FIG. 3 to that shown in FIG. 4, it will cause the horizontal arm 102 to move upwardly into engagement with the pin 87' to release the leg 88 from the notched portion 84' in the forward extension 84 of the control plate 82 and permit the control plate 82 to return to its rearwardmost position as shown in FIG. 4.

The trip arm 15 is activated as described by the weight member 16 which is slidable through the hollow interior of the handle portion 14 of the rod 11. Preferably, the weight member 16 takes the form of a metal sleeve composed of a high density material, e.g. lead, and having a central bore 105 to receive a forward end 106 of a threaded stem 108. The stem 108 has a rearward threaded end 110 which threadedly engages a nut 112 at the rearward end of the handle portion 14. A nut 114 is threaded onto the stem 108 behind the weighted member 16 and includes a radial projection 115 inserted into a longitudinal slot 116 of a tube 118 which is disposed in inner spaced concentric relation to outer tubular portion 120. The nut 112 is rotatable within the end of the handle portion 14 to rotate the stem 108 and adjust the position of the nut 114 on the stem. The nut 114 serves as an adjustable end stop for the weight 16 so that the distance of travel of the weight 16 between the nut 114 and trip arm 15 in response to a forward casting motion can be varied. In this way, as the rod 11 is raised to a vertical or past-vertical position preliminary to casting, the weight 16 will slide rearwardly through the handle end of the position shown in FIG. 3. When the fisherman depresses the thumb control 52 to force the control plate 82 forwardly causing the release tube 26 to retract the pick-up member 45, the control plate 82 will be locked in the forward position shown in FIG. 3 by the pivot member 89; and the upper pivot leg 75 will be forced downwardly away from the spacer block 80. When the rod 11 is then cast or thrust forwardly, the weight 16 will advance forwardly into engagement with the trip arm 15 thereby releasing the control plate 82 and causing the lower pick-up rod 86 to retract out of the path of advancement of the line L which is then free to unwind off of the spool 34. By threadedly adjusting the nut 114, the fisherman can control the timing of the cast and the point of release by the trip arm.

As best seen from FIGS. 6 and 7, the reel may be placed either in the "manual" or "automatic" mode by a pivotal control dial 122 located on the exterior of one of the side walls 50 just forwardly of the crank, for example, as illustrated in FIG. 2. The external control dial 122 includes an upwardly projecting arm 123 externally of the side wall 50 which may be set at A for "automatic" or M for "manual". As best seen from FIGS. 5, 6 and 7, an eccentric arm 124 extends inwardly from an inner face of the control 122 and is pivotal between a vertical attitude, as shown in FIG. 6, so as to be spaced laterally from the vertical leg 90 of the pivot 89; or can be pivoted, as shown in FIG. 7, to cause the eccentric bar 124 to rotate into engagement with the leg 90 so that the lower leg 88 is raised out of the path of the forward extension 84 of the control plate 82. As previously described, when the lower leg 88 is held out of the path of the forward extension and is not free to drop into the notched portion 84' when the control plate 82 is driven forwardly by the thumb control 52, casting is entirely under control of the fisherman. In other words, the fisherman must manually time the release of the thumb control 52 in the course of each forward cast or throw to control the point of release of the fishing line L. Again, when the thumb control 52 is released, the pick-up rod 86 will be retracted out of the path of the fishing line, and the fisherman must reset the pick-up member 45 by turning the crankshaft to cause the spool to advance forwardly into engagement with the underside of the pick-up lever 40.

An anti-reverse mechanism of a type disclosed in my prior U.S. Pat. No. 4,725,017 includes a ratchet gear 37 having teeth 38 and mounted for rotation on the crankshaft 58. A dog 39 is pivotal just outwardly of the pivot 89 to move into engagement with one of the teeth 38 as shown in FIG. 3. If the crankshaft 58 is reversed in rotation, or in a clockwise direction as illustrated, the dog 39 will engage one of the teeth to resist any continued rotation.

It will be apparent that the centrifugal force-responsive means and particularly the adjustable weight mechanism in the handle may be modified according to different applications and reel and rod constructions. For example, in place of the threaded stem 108 and nut 115 inside of a separate sleeve 116, the outer wall 120 of the handle may serve as the sleeve with a vane or rib extending lengthwise along the inner surface of the handle. In turn, the nut 115 would be provided with a slot which rides along the vane and can be threadedly adjusted by a stem to position the weight 16 at the desired distance away from the trip arm 15.

From the foregoing, it will be appreciated that a novel and improved form of line control for a reel has been devised which is characterized in particular by utilization of a weighted member to automatically release a line pick-up member in response to the forward throw of the reel in a casting operation. This feature obviates manual release of the cast conrol button so that the fisherman can concentrate on the force or speed and accuracy of the throw. In this relation, the weighted member 16 will give the fisherman a definite feel for the optimum force and acceleration to be used in releasing the line and then rotating the crankshaft 58 to terminate the cast by advancing the line pick-up member 45 back into the path of advancement of the line. The manual casting control mechanism is still available to the fisherman if, for example, it is desired to make shorter casts or experiences any difficulty in imparting the necessary force to activate the automatic casting mechanism.

It is therefore to be understood that while a preferred form of casting control mechanism is herein set forth and described, the above and other modifications and changes may be made without departing from the spirit and scope of the present invention as defined by the appended claims and reasonable equivalents thereof.

I claim:

1. A casting control mechanism comprising a reel for use in combination with a rod having a handle portion wherein a fishing line is wound upon a spool at one end of a drive shaft with a line pick-up member movable into the path of advancement of said fishing line away from said spool in response to rotation of a crank in guiding said fishing line onto said spool, the improvement comprising:

release means associated with said reel for retracting said pick-up member out of the path of advancement of said fishing line including a trip arm and centrifugal force-responsive means mounted on said handle portion of said rod and movable by centrifugal force for engaging said trip arm to activate said release means in response to a centrifugal force resulting from a forward casting motion of said reel whereby to retract said pick-up member out of the path of advancement of said line.

2. The mechanism according to claim 1 wherein said centrifugal force-responsive means includes a weight slidable in the direction of casting into engagement with said trip arm in response to the application of centrifugal force.

3. The mechanism according to claim 1 wherein said centrifugal force-responsive means is disposed in a hollow interior space in said rod, and said trip arm extends into said rod.

4. The mechanism according to claim 3 wherein said centrifugal force-responsive means includes a weight member slidable in a lengthwise direction through said rod into and away from engagement with said trip arm, and adjusting means for adjusting the initial position of said weight member with respect to said trip arm prior to casting.

5. The mechanism according to claim 1 wherein said rod includes a hollow interior, said trip arm extending through an elongated slot into communication with said hollow interior, said centrifugal force-responsive means having a generally sleeve-like weight member disposed in said hollow interior, and a threadedly adjustable stop member movable through said hollow interior for positioning said weight member in predetermined spaced relation to said trip arm preliminary to casting.

6. The mechanism according to claim 1 wherein manual casting control means is provided for advancing said pick-up member into the path of advancement of said fishing line prior to casting, and selector means is provided for selecting one of said force-responsive means and said manual casting control means preliminary to forward casting of said rod and reel to retract said pick-up member.

7. The mechanism according to claim 1 wherein said manual casting control means includes a thumb control button on said fishing reel engageable with said release means to retract said pick-up member out of the path of said fishing line.

8. A fishing line release mechanism comprising a rod, a reel mounted on said rod wherein a fishing line is wound upon a spool at one end of a drive shaft with first and second line pick-up members movable into and away from the path of advancement of said fishing line, said first line pick-up member movable out of the path of said fishing line in response to manual shifting of a casting control member, the improvement comprising:

release means mounted in said reel for retracting said second line pick-up member out of the path of said fishing line including a trip arm extending from said reel through an elongated slot in said rod, and centrifugal force-responsive means mounted in said rod for engaging said trip arm to activate said release means in response to a centrifugal force resulting from a forward casting motion of said rod and reel whereby to retract said second line pick-up member out of the path of advancement of said line.

9. The mechanism according to claim 8, said centrifugal force-responsive means including a weight slidable lengthwise of said rod into engagement with said trip arm in response to the application of centrifugal force.

10. The mechanism according to claim 9 wherein said weight is disposed in a hollow interior space in said rod and said trip arm extends through an elongated slot in said rod into communication with said space.

11. The mechanism according to claim 8 wherein said centrifugal force-responsive means includes a weight member slidable in a lengthwise direction into and away from engagement with said trip arm, and adjusting means for adjusting the position of said weight member with respect to said trip arm prior to casting.

12. The mechanism according to claim 8 wherein said rod includes a hollow interior, said trip arm extending through an elongated slot into communication with said hollow interior, said force-responsive means defined by a generally sleeve-like weight member disposed in said hollow interior, and a threadedly adjustable stop member movable through said hollow interior for positioning said weight member in predetermined spaced relation to said trip arm.

13. The mechanism according to claim 8 wherein manual casting control means is provided for retracting said first line pick-up member out of the path of said fishing line and for advancing said second line pick-up member into the path of said fishing line preliminary to casting, said release means including releasable locking means for locking said second line pick-up member in the path of said fishing line until said release means is activated by said trip arm.

14. The mechanism according to claim 13 wherein selector means is provided in association with said releasable locking means for selectively disengaging said releasable locking means from said second line pick-up member whereby said second line pick-up member is movable into and out of the path of said fishing line solely in response to said manual casting control means.

15. The mechanism according to claim 13 wherein said manual casting control means includes a thumb control button on said fishing reel engageable with said second line pick-up member to advance said second line pick-up member into and out of the path of said fishing line.

16. The mechanism according to claim 15 wherein said manual casting control means includes a control plate and a release tube movable forwardly into engagement with said first line pick-up member for retracting said first line pick-up member out of the path of said fishing line.

17. The mechanism according to claim 16 wherein said manual casting control means includes a thumb control button engageable with said control plate to advance said release tube forwardly into engagement with said first line pick-up member.

18. A casting control mechanism comprising a reel wherein a fishing line is wound upon a spool at one end of a drive shaft with a line pick-up member movable into the path of advancement of said fishing line away from said spool in response to rotation of a crank in guiding said fishing line onto said spool, and wherein a rod is provided for mounting of said reel, the improvement comprising:

release means mounted in said reel for retracting said pick-up member out of the path of advancement of said fishing line including a trip arm and centrifugal force-responsive means mounted externally of said reel for engaging said trip arm to activate said release means in response to a centrifugal force resulting from a forward casting motion of said reel whereby to retract said pick-up member out of the path of advancement of said line, said rod including a hollow interior, said trip arm extending through an elongated slot into communication with said hollow interior, said centrifugal force-responsive means having a generally sleeve-like weight member disposed in said hollow interior, and a threadedly adjustable stop member movable through said hollow interior for positioning said weight member in predetermined spaced relation to said trip arm preliminary to casting.

\* \* \* \* \*